United States Patent [19]
Saxenmeyer, Sr.

[11] 3,867,693
[45] Feb. 18, 1975

[54] LSI CHIP TEST PROBE CONTACT INTEGRITY CHECKING CIRCUIT

[75] Inventor: George J. Saxenmeyer, Sr., Vestal, N.Y.

[73] Assignee: International Business Machines Corporation, Armonk, N.Y.

[22] Filed: Feb. 20, 1974

[21] Appl. No.: 444,219

[52] U.S. Cl. ............... 324/73 R, 324/158 P, 324/51
[51] Int. Cl. ............................................. G01r 31/02
[58] Field of Search ........... 324/158 F, 158 P, 73 R, 324/51, 28

[56] References Cited
UNITED STATES PATENTS
| | | | |
|---|---|---|---|
| 3,506,911 | 4/1970 | Stone | 324/28 |
| 3,721,899 | 3/1973 | Haywood | 324/73 |
| 3,728,616 | 4/1973 | Cheek et al. | 324/73 X |
| 3,746,973 | 7/1973 | McMahon | 324/73 X |

OTHER PUBLICATIONS

Hubacher, E. M., "Insuring Proper Probe Contact ...," IBM Technical Disclosure Bulletin, Vol. 15, No. 11, April 1973, pp. 3552-3553.

Markewycz, Z., "Multiple Chip Via Test Fixture," IBM Technical Disclosure Bulletin, Vol. 14, No. 9, Feb. 1972, pp. 2583-2584.

Markewycz, Z., "High-Density, Cast Channel AC-DC Wafer Probe Package," IBM Technical Disclosure Bulletin, Vol. 16, No. 1, June 1973, pp. 23-24.

*Primary Examiner*—Alfred E. Smith
*Assistant Examiner*—Rolf Hille
*Attorney, Agent, or Firm*—John C. Black

[57] ABSTRACT

LSI (large scale integration) semiconductor chips have two sets of Schottky diodes formed therein for assuring electrical contact between the chip voltage supply and I/O (input-output) signal contacts (or pads) and test probes. The diodes of one set form an AND circuit having the diode inputs coupled to respective chip input signal contacts. The other set of diodes have first terminals coupled to the output of the AND circuit, and have second terminals, each coupled to a respective chip output signal contact. When a plurality of test probes are brought into contact with the chip I/O and voltage supply contacts preliminary to running static and/or dynamic tests on the chip circuits, a selected signal level is applied concurrently to all probes which are connected to chip input signal contacts and to probes connected to the supply contacts. If there is good electrical contact between these probes and each of the input and supply contacts, a selected signal level (e.g. UP) appears at the output of the AND circuit. This output signal is then applied by the AND circuit (or an amplifier) to each of the chip output contacts via a respective diode in said other set, irrespective of the states of the functional logic on the chip. If good electrical contact exists between the chip output contacts and their respective probes, the UP output signal level will appear on all of the latter probes. Detection of the UP signal level on all of the latter probes indicates good contact between all probes and chip contacts. Once this is established, functional testing of the chip circuits can begin.

7 Claims, 2 Drawing Figures

LSI CHIP TEST PROBE CONTACT INTEGRITY CHECKING CIRCUIT

BACKGROUND OF THE INVENTION

The invention is directed to assuring electrical contact between test probes and LSI chip contacts before initiating functional testing of the logic circuits in the chip.

The primary, or external, input and output interconnections for an LSI chip are always limited to some fixed design maximum number, from which the logic designer selects his actual functional requirements. A typical test data file contains sequences of test patterns adjudged by the logic designer to adequately evaluate the functional performance of the chip. This information is used to test chip product in wafer form before dicing, and also for retesting the chip in place on the module substrate after dicing and joining.

Current production of LSI chips ranges from the tens to hundreds of I/O pads overlaid with solder balls, which are reflowed to attach the chip to its host module substrate which provides the chip-to-chip and off-module interconnections. The test probes, for both wafer and chip-in-place testing, must provide simultaneous electrical contact to all contacts constituting the chip's signal and power-supply interfaces.

Final alignment of the test probe is normally accomplished manually, by visual observation of superimposed optical images of the test probe points and their target contact pads. This optical system is physically interposed between the two arrays of probe points and contact pads, and must be mechanically moved out of interference with the final motion of the probe into the contact position. There is no satisfactory method of observing the ultimate probe-to-contact-pad alignment visually, subsequent to this final Z-axis motion. An illustration of existing alignment procedures is shown in the IBM Technical Disclosure Bulletin, Volume 16, Number 1, pages 23, 24, published June 1973.

Since the testing of the chip is performed electronically, some similarly electronic means of conclusively checking this final test probe alignment is the ideal choice. Also, the chip itself must be modified, to furnish an unambiguous passive response through the probe contacts individually, in order to exercise them all concurrently.

One proposal for insuring probe contact is described in IBM Technical Disclosure Bulletin, Volume 15, Number 11, pages 3,552, 3,553, published April, 1973. This proposal is intended for manual use and connects a current source to all I/O pads on a semiconductor chip via a common input probe, a common input pad, a common bus and a plurality of Schottky diodes, each connected to a respective I/O pad. Current flow from the source through the diodes to the I/O pads is sensed by an ammeter connected to the probes (in sequence) if the probes make good electrical contact with the I/O pads. Sensing is done sequentially probe-by-probe; however, the functional circuits on the chip are continuously operated. Thus, the current source must supply through one common probe and contact sufficient input current for all circuits coupled to the I/O pads. This creates a serious problem for the miniature LSI chips and pads. Also, if the connection between the common probe and pad is intermittent, the test fails even though all of the probe-I/O contact connections are good.

In the course of testing advanced LSI chips on a pilot line, one of the most formidable operating difficulties is poor wafer test probe contact. The basic reason for this problem is that the contact or pad on the chip has by now shrunk to 5 mils diameter or less, much too small to possibly contact with a two-point Kelvin probe. Thus, the test must rely on the correct functional behavior of the good chip, to prove probe contact integrity. The dilemma is that poor probe contact makes a good chip look like a bad one.

With poor product yields, it is extremely difficult to differentiate between consistently poor test probe contact and perponderantly bad product. Conversely, if a given chip does test fault free, we can be reasonably confident that it really is, because it is highly unlikely that poor probe contact can defeat the fault-location integrity of the test patterns.

However, poor test probe contact integrity can and probably does occasionally cause a bad chip to pass the test, if the right combination of probe contacts happen to be intermittently open simultaneously at the wrong time in the test pattern sequence. If and when this does happen, there will be two primary effects: a lot of good product will be rejected, and a few bad chips will be accepted. The secondary effects are to make the yield abnormally low and the SPDL (shipped product defect level) abnormally high.

SUMMARY OF THE INVENTION

Accordingly it is a primary object of the present invention to provide an improved means for checking the electrical connections between test probes and I/O chip contacts prior to functional testing of the chip circuits.

This object is achieved in a preferred embodiment by developing in the chip an N-way AND of Schottky barrier diodes, having a common base diffusion and individual emitters each wired to a respective one of the primary input pads in parallel with the functional circuit inputs. The primary output pads are also wired to a similar array of common-base Schottky barrier diode emitters, operating in the opposite direction functionally.

Finally, by interposing a suitable buffer amplifier, also integral to the chip, between the common base regions of these two Schottky barrier diode matrices, the checking circuit is complete. Now, when and only when all of the chip primary input pads actually receive concurrent up-level signals and the supply contacts receive the proper voltage levels, all primary output pads will emit simultaneous up-level signals. If, in turn, these primary output up-levels are all concurrently detected by the test apparatus in the system to which the probes are attached, all output pads must be contacting their probes; and complete contact integrity of all active test probe points is determined.

The functional stability of probe contact can then be analyzed, on the basis of whatever electrical and timing parameters are appropriate. In general, once initial contact integrity has been established, intermittent contact of any given probe point is relatively unlikely. As a direct result, it becomes possible to utilize this check circuit as a "probe down" signal, to terminate the lowering of the probe assembly to the chip surface; and also as the triggering means, to initiate the execution of the conventional test pattern sequence, thereby substantially increasing the efficiency and throughput of the test system.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
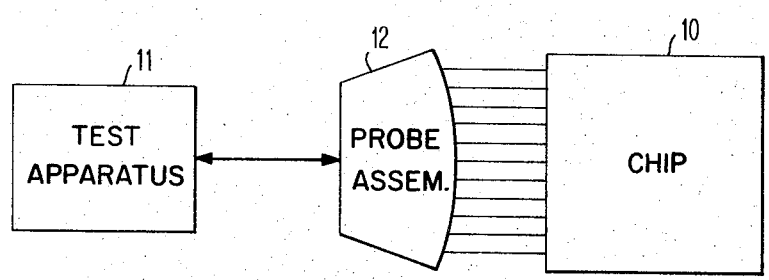
FIG. 1 is a diagrammatic illustration of a production line test system with a probe assembly for making electrical contact with the voltage supply and I/O contacts of an LSI semiconductor chip.

FIG. 1 illustrates diagrammatically an LSI chip 10, data processor controlled test apparatus 11 and a suitable probe assembly 12 for interconnecting the test apparatus 11 to the chip 10. Any of several types of test apparatus well known in the art may be used, one example being that disclosed in U.S. Pat. No. 3,492,572 issued Jan. 27, 1970, to H. E. Jones, et al. Said patent describes programmable circuit testing apparatus which has been designed for testing electronic circuit cards. Typically due to the great strides in increasing the density of circuits in semiconductor chips, a single LSI chip of today's technology corresponds essentially to the circuits on one card in the technology for which the patented apparatus was designed. The circuits per se have not changed. Thus by substituting a suitable LSI chip probe assembly for the output contact assembly of the patented apparatus, the apparatus can be utilized for testing the LSI chip. One example of a suitable probe assembly is shown in the IBM Technical Disclosure Bulletin, Volume 16, Number 1, pages 23 and 24, published June 1973. In the patented apparatus for testing electronic circuits, a plurality of similar circuits are provided, one for each LSI chip contact. Each of said similar circuits is programmed to apply to a specific contact of the LSI chip under test a selected one of a plurality of conditions, e.g., a positive or negative driver input signal, a positive or negative load, a positive or negative power supply potential, ground potential or an open circuit condition.

Figure 2:
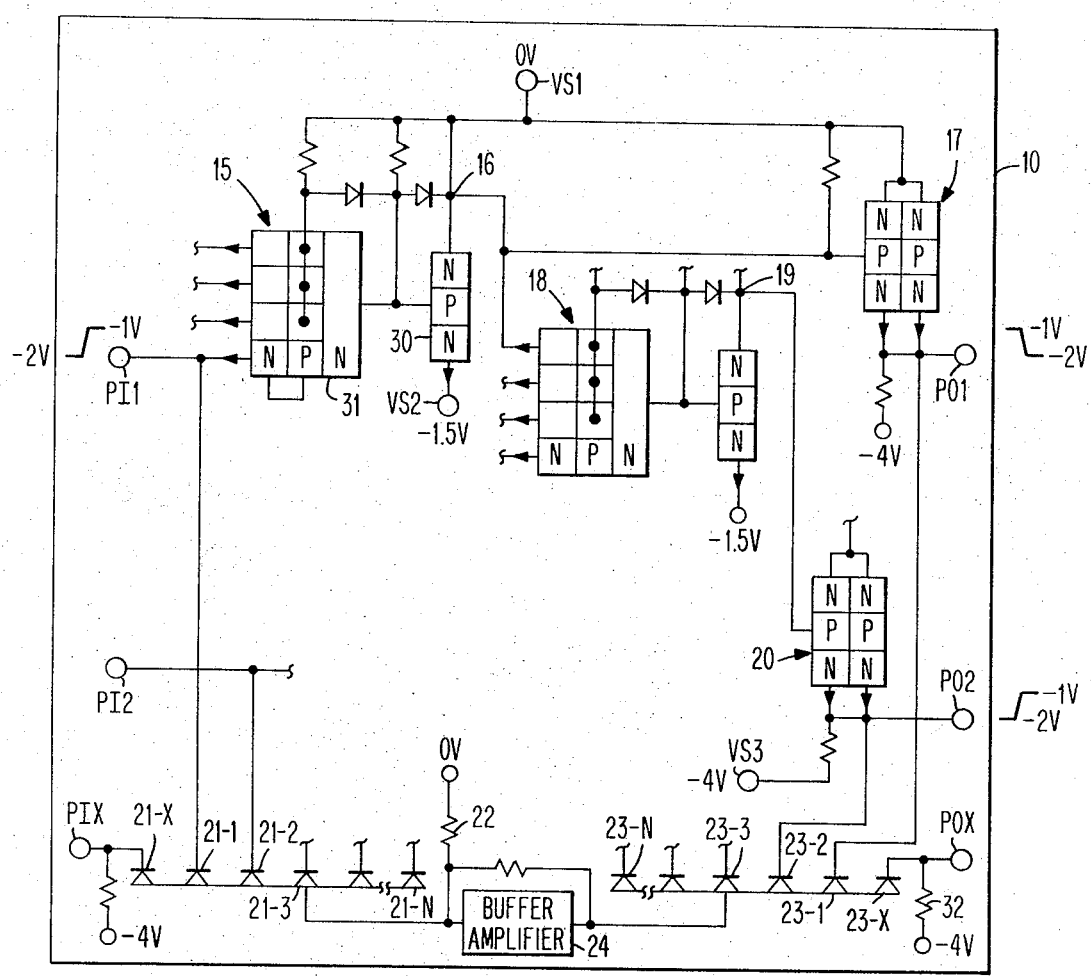
FIG. 2 is a fragmentary schematic diagram of typical functional logic circuits in an LSI chip, incorporating the improvement of the present application.

FIG. 2 is a fragmentary schematic diagram of the LSI chip 10. Although a typical LSI chip in today's technology may have in the order of one hundred I/O contacts and in the order of several hundred semiconductor logic circuits, only one of said logic circuits and a few of the input and output contacts are shown.

Thus the illustrative chip 10 includes a typical pair of input signal contacts PI1 and PI2. A typical pair of output contacts PO1 and PO2, voltage supply contacts VS1, VS2 and VS3. A first four-input inverting logic circuit 15 has one of its inputs connected to the input contact PI1. The output 16 of the logic circuit 15 is coupled to an emitter follower output driver 17 which has its emitter electrodes coupled to the output contact PO1. The output terminal 16 is also coupled to one input of a second inverting logic circuit 18 which has output contact 19 coupled to the output contact PO2 by way of an emitter follower driver circuit 20.

The logic circuits 15 and 18 and their respective output drivers 17 and 20 are conventional well-known transistor logic circuits and will not be described in detail. When an input voltage signal transition from −2 volts to −1 volt is applied to the input contact PI1, the drivers 17 and 20 will produce an output transition from −1 volt to −2 volts at contact PO1 and an output signal from −2 volts to −1 volt at the output contact PO2.

The preferred embodiment of the improved contact integrity checking circuit of the present application comprises a first plurality of Schottky barrier diodes 21-1 to 21-N having a common base diffusion and individual emitters. The emitter of the diode 21-1 is connected to the primary input contact PI1 and the emitter of the diode 21-2 is connected directly to the primary input contact PI2. The remaining emitters 21-3 to 21-N are connected directly to corresponding primary input contacts (not shown). The commoned base electrode of the diodes 21-1 to 21-N is connected to ground potential by way of a current limiting resistor 22.

A second array of commoned base Schottky barrier diodes 23-1 to 23-N have their emitters connected to corresponding primary output contacts. Thus the emitters of diodes 23-1 and 23-2 are connected respectively to the primary output contacts PO1 and PO2.

In the event that the LSI chip 10 has only a few logic circuits thereon so that the number of Schottky diodes 23-1 to 23-N is small, the common base electrodes of the two diode arrays can be connected directly to each other because the current drive requirements are small. In such an event, if positive potentials were applied concurrently to the emitters of all diodes 21-1 to 21-N, the voltage levels at the common base electrodes of both diode arrays would be approximately −1 volt. This −1 volt potential is coupled by the diodes 23-1 to 23-N to their primary output contacts such as PO1 and PO2 irrespective of the input signal levels applied to the emitter follower drivers such as 17 and 20. Logical UP levels (more positive than −2 volts) will appear at all output contacts.

However, since the typical LSI chip has a very large number of circuits, a buffer amplifier 24 is usually required between the base diffusions in order to provide sufficient current for the large number of circuits coupled to the emitters of the diodes 23-1 to 23-N to force the contacts PO1 to PON to a logical UP level.

If we assume now that the probe assembly 12 has been brought into contact with the voltage supply and I/O contacts of chip 10 and that the test apparatus 11 is now prepared to first check contact integrity between the probes of assembly 12 and the contacts of chip 10, the first step of the test procedure will be to apply the proper voltage levels to the chip contacts VS1, VS2 and VS3 and then to apply positive going signals to all of the primary input contacts such as PI1 and PI2.

Suitable logical levels are:

| | | Nominal Level |
|---|---|---|
| Most Positive Up Level | − 0.700 volt | −1 V |
| Least Positive Up Level | − 1.150 volt | |
| Least Negative Down Level | − 1.600 volt | −2 V |
| Most Negative Down Level | − 2.100 volt | |

If there is good contact between the primary input contacts and their respective probes in assembly 12, these positive going signals will be applied to the emitters of the diode array 21-1 to 21-N. The voltage level of the common base diffusion of the diode array will become more positive and the buffer amplifier 24 will drive the base electrode of the second diode array more positive. This will cause the voltage levels of all primary output contacts such as PO1 and PO2 to go to their logical UP levels irrespective of the states of the internal logic circuits such as 15 and 18 to which they are connected.

If there is reliable electrical contact between each of the primary output contacts such as PO1 and their corresponding probes of assembly 12, the logical UP level signals on the primary output contacts will be transmitted to the test apparatus 11 which in turn senses these UP level signals. Assuming that the test apparatus senses UP level signals on all primary output contacts, testing of the logic circuits such as 15 and 18 will then be initiated.

If any one of the primary input contacts such as PI1 does not make reliable contact with its corresponding probe in assembly 12, the AND function provided by the first diode array will not be satisfied and the diode array will not override the signal levels applied to the primary output contacts by the logic circuits such as 15 and 18. Specifically, the negative voltage level from the contact VS2 will be applied, by way of the base emitter circuit of the transistor 30 and the transistor 31 having short-circuited base and emitter contacts, to the emitter of the diode 21-1. This negative potential at the emitter of the diode 21-1 will maintain the common base electrode of the diode array at a relatively negative level.

With this negative potential applied to the common base diffusion of the second diode array, the primary output contacts are not significantly or functionally affected by the diode arrays.

Thus it is absolutely necessary that reliable contact be made between each and every supply contact and its probe, between every primary input contact and its probe, and between every primary output and its probe, in order for the test apparatus 11 to sense UP signal levels concurrently at all primary output contacts. Reliable contact between all probes and the respective chip contacts is thus determined by the test apparatus.

The arrangement described above assumes that the chip 10 can never have a logical input signal pattern in normal use where the input signals to the primary input contacts are all concurrently positive. In such an event, it would not be possible to produce any negative signal levels at the primary output contacts in response to the logic such as 15 and 18, because the diode arrays would override the logic to produce relatively more positive signal levels at all primary output contacts. In such a chip, one additional diode 21-X and one additional primary input PIX must be provided. During normal operation of the chip 10, the contact PIX is externally held at a negative signal level, thus preventing satisfaction of the AND function provided by the first diode array 21. This of course reduces by one the number of I/O contacts that are available for use under normal operating conditions.

A second special situation exists in the event that the LSI chip 10 can, during normal operation, produce positive levels concurrently at all of the primary output contacts such as PO1 and PO2. A typical example of such a situation is where the LSI chip 10 is a set of registers which, in their reset states, produce positive signals at all primary output contacts. In such an event, one I/O contact POX must be used for test purposes only and is connected to a diode 23-X of the second diode array. On the chip 10 the contact POX is connected by way of a resistor 32 to a negative supply which will always produce a relatively negative level at the contact POX except when the AND function of the first diode array is satisfied during the contact integrity checking procedure.

In a typical chip, the diodes can be formed in a common P-region near the dicing kerf, so that no significant amount of usable chip space is pre-empted.

It will be appreciated that diodes other than Schottky barrier diodes may be used in the diode arrays and that other semiconductors such as transistors can be used instead. Such modifications are well within the skill of the art and need not be elaborated.

It will be further appreciated that, although bipolar transistor logic circuits have been illustrated by way of example in the preferred embodiment, the present improvement may be used in conjunction with the testing of all other known types of semiconductor logic as well, and that the invention is not to be limited to the details of the preferred embodiment which is illustrated in the drawings.

Another alternative is the coupling of the diodes 23-1 to 23-N to the base electrodes of the emitter followers such as 17 and 20 rather than directly to the contacts PO1 to PON.

It will be appreciated that the output of the diode array 21-1 to 21-N could be sensed via a dedicated pad to check contact integrity between input pads and probes. Another dedicated pad could supply an UP signal to the diode array 23-1 to 23-N to check contact integrity between probes and output pads PO1 to PON. However, these approaches would use two pads which could otherwise be used for I/O paths.

While the invention has been particularly shown and described with reference to a preferred embodiment thereof, it will be understood by those skilled in the art that the foregoing and other changes in form and details may be made therein without departing from the spirit and scope of the invention.

I claim:

1. A method for determining contact integrity between voltage supply, input and output contacts of a semiconductor chip having logical circuits formed therein and coupled between said input and output contacts, and supply, input and output test probes adapted to be brought into electrical engagement with respective supply, input and output contacts, said method comprising the steps of applying voltage supply and input signals concurrently to the supply and input test probes, sensing said input signals by means of a logical AND circuit on the chip having its input connected to the input contacts and producing an output signal when said input signals are sensed concurrently by all AND circuit inputs, applying said output signal concurrently to all output contacts, sensing the output signals on the output test probes to determine whether or not all test probes are in electrical engagement with their respective chip contacts.

2. The combination comprising,
a large scale integration semiconductor chip having
a plurality of input contacts adapted to receive input signals,
a plurality of output contacts, and
a plurality of logic circuits including inputs connected to respective ones of the input contacts, including outputs connected to respective ones of the output contacts and responsive to input signals received by the input contacts for producing output signals at said output contacts,
means for generating concurrently a desired input signal pattern for application to the chip input contacts,
test probes connected to said generating means and adapted to be brought into engagement with respective ones of the input contacts for coupling said signal pattern to the input contacts,
a logical AND circuit on the chip having an output and having a plurality of inputs, each input connected to a respective one of the input contacts for producing an output signal when the input signal pattern is applied concurrently to the input contacts,
means on the chip coupling the output of the AND circuit to each of the output contacts for forcing the output contacts to a selected signal level when the AND circuit produces said output signal,
additional test probes adapted to be brought into engagement with the output contacts, and
means connected to the additional test probes for sensing the selected signal level on all of the output contacts concurrently, thereby determining contact integrity between said contacts and test probes preliminary to electrical testing of said logic circuits via the test probes.

3. A large scale integration semiconductor chip having
a plurality of input contacts adapted to receive input signals,
a plurality of output contacts, and
a plurality of logic circuits including inputs connected to respective ones of the input contacts, including outputs connected to respective ones of the output contacts, and responsive to input signals received by the input contacts for producing output signals at said output contacts,
the combination with said input contacts, output contacts and logic circuits of means on the chip for determining contact integrity concurrently between the said contacts and test probes preliminary to electrical testing of said logic circuits via the test probes, said means comprising
a logical AND circuit having an output and having a plurality of inputs, each input connected to a respective one of the input contacts, for producing an output signal when selected input signals are applied concurrently to the input contacts, and
means coupling the output of the AND circuit to each of the output contacts for forcing the output contacts to a selected voltage level when the AND circuit produces said output signal.

4. The chip of claim 3 wherein the logical AND circuit comprises
a plurality of Schottky diodes having a common base electrode forming the AND circuit output and having emitters forming the AND circuit inputs.

5. The chip of claim 4 wherein the last-mentioned means comprises
an additional plurality of Schottky diodes having a common base electrode coupled to the AND circuit output and having emitters coupled to the output contacts.

6. A large scale integration semiconductor chip having
a plurality of input contacts adapted to receive input signals;
a plurality of output contacts;
a plurality of logic circuits including inputs connected to respective ones of the input contacts, including outputs connected to respective ones of the output contacts and responsive to input signals received by the input contacts for producing output signals at said output contacts;
the combination with said input contacts, output contacts and logic circuits of means on the chip for determining contact integrity concurrently between the input contacts and respective test probes preliminary to electrical testing of said logic circuits via the test probes, said means comprising
a logic AND circuit having an output and having a plurality of inputs, each input connected to a respective one of the input contacts, for producing an output signal when selected input signals are applied concurrently to the input contacts; and
means coupling the output of the AND circuit to an output contact for forcing the output contact to a selected voltage level when the AND circuit produces said output signal.

7. A large scale integration semiconductor chip having
a plurality of input contacts adapted to receive input signals;
a plurality of output contacts; and
a plurality of logic circuits including inputs connected to respective ones of the input contacts, including outputs connected to respective ones of the output contacts, and responsive to input signals received by the input contacts for producing output signals at said output contacts;
the combination with said input contacts, output contacts and logic circuits of means on the chip for determining contact integrity concurrently between said contacts and test probes preliminary to electrical testing of said logic circuits via the test probes, said means comprising
a first plurality of Schottky barrier diodes connected to form a logic AND circuit, each diode having an input terminal coupled to a respective one of the input contacts and having an output terminal coupled in common with the output terminals of the remaining diodes,
a second plurality of Schottky barrier diodes, each second diode having one terminal coupled to a respective one of the output contacts and having another terminal coupled in common with the other terminals of the remaining second diodes to the output terminals of the first diodes, and
said first diodes adapted to respond to a signal of selected voltage applied concurrently to all of the input contacts for causing the second diodes to force all of the output contacts to a selected voltage level.

* * * * *